United States Patent Office 3,848,001
Patented Nov. 12, 1974

3,848,001
PURIFICATION OF BETA-NAPHTHOL BY
EXTRACTIVE CRYSTALLIZATION
John Peter Dundon, Branchburg Township, N.J., assignor to American Cyanamid Company, Stamford, Conn.
No Drawing. Filed Dec. 21, 1972, Ser. No. 317,463
Int. Cl. C07c 37/28
U.S. Cl. 260—621 B       2 Claims

ABSTRACT OF THE DISCLOSURE

Alpha-naphthol, present as an impurity in beta-naphthol, is substantially completely removed by (1) forming a mixture of the beta-naphthol, in molten form, and water, at a temperature above 90° C., (2) cooling the mixture with continuous mixing over the range of from 90° C. to 80° C., whereby crystallization of the beta-naphthol occurs and the alpha-naphthol is extracted into the water, and (3) filtering off the purified beta-naphthol.

This invention relates to the purification of beta-naphthol and more particularly, to the purification of beta-naphthol containing minor amounts of alpha-naphthol as a contaminant. Still more particularly, the invention relates to a novel extractive-crystallization process whereby small amounts of alpha-naphthol are substantially completely removed from the beta-naphthol.

Beta-naphthol when prepared commercially, as for example, by the oxidation-hydroperoxide cleavage process, contains small amounts of alpha-naphthol, usually from about 1 to about 3 percent. For certain uses, however, the presence of even these amounts of alpha-naphthol are detrimental. For example, where the beta-naphthol is used in the manufacture of dyes and pigments, the presence of more than about 0.3% of the alpha isomer can adversely affect the color or shade of the dye product. The separation of the alpha-naphthol to achieve this very low alpha-naphthol content by distillation is both cumbersome and expensive. There is a real need, therefore, for a simpler and less expensive technique for the removal of the alpha-naphthol. Such a means is provided by the present invention.

Thus, in accordance with this invention, it has been found that the alpha-naphthol content of the beta-naphthol may be reduced to very low levels by a relatively simple procedure involving (1) heating a mixture of the beta-naphthol and water to a temperature above about 90° C., preferably from about 90 to 99° C., whereby the beta-naphthol is in molten form and then (2) cooling the mixture to about 80° C., with continuous mixing, whereby crystallization of the beta-naphthol takes place and the alpha-naphthol is extracted into the water where it remains dissolved. The mixture is then further cooled and the purified beta-naphthol crystals filtered off.

An advantage of the process of the invention is that it avoids the use of the higher temperatures involved in distillation techniques where decomposition of the beta-naphthol tends to occur.

It is surprising that the purification of beta-naphthol can be achieved by the process since experiments have shown that no significant removal of alpha-naphthol is effected by contacting fine crystals of the beta-naphthol with water for prolonged periods of time. (See Example 5(B) below.) Also, it has been found that repeated extraction of molten beta-naphthol with water at 95° C. effects no noticeable change in the alpha-naphthol content (Example 6 below).

During the cooling of the molten beta-naphthol-water mixture from 90° C. to about 80° C., a high degree of agitation should be maintained so that there is intimate contact between the aqueous phase, the organic (i.e., molten beta-naphthol) phase and the forming beta-naphthol crystals. The bulk of the crystallization of beta-naphthol containing up to about 3% alpha-naphthol takes place within the range of 90° C. to 85° C. and is completed by the time the temperature reaches about 80° C. The rate of the cooling in that range affects the extent of the transfer (i.e., extraction) of the alpha-naphthol from the organic phase into the water phase. Thus, if the cooling rate is extremely rapid (Example 5(A) below) the degree of extraction, although substantial, is limited. However, a cooling period of about 30 seconds gives better results (Example 1 below), and longer cooling periods, up to 15 minutes, give even better results (Examples 2, 3 and 4 below).

While, therefore, very rapid cooling of the molten beta-naphthol-water mixture over the crystallization temperature range substantially reduces the alpha-naphthol content of the beta-naphthol, slower cooling times, i.e., from about 30 seconds up to about 15 minutes, give better results, the preferred cooling time being from about 3 to about 15 minutes. Periods longer than 15 minutes may be used without detriment; however, they provide no advantage and are, therefore, not recommended as a practical matter.

From about 4 to about 20 parts of water per part of beta-naphthol can be used in the molten beta-naphthol-water mixture, although from about 4 to 12 parts per part of beta-naphthol is usually adequate. As a practical matter, the amount of water will depend to some degree on the degree of purity of the beta-naphthol being treated. Thus, for a beta-naphthol product containing a relatively high proportion of alpha-naphthol, a relatively high proportion of water may be used.

The following examples will serve to illustrate the invention.

EXAMPLE 1

A mixture of one part beta-naphthol (containing 1.2% alpha isomer) and four parts of water was heated at 95° C. until the beta-naphthol was melted. The mixture was then stirred vigorously and the temperature lowered over the range of 90° C. to 80° C. in approximately 30 seconds. The slurry of crystallized product was then cooled to room temperature and filtered. Analysis showed the alpha-naphthol content of this purified product to be 0.35%.

EXAMPLE 2

A mixture of one part of beta-naphthol (containing 1.2% alpha isomer) and four parts of water was heated at 95° C. until the beta-naphthol was melted. The mixture was then stirred vigorously and the temperature lowered over the range of 90° C. to 80° C. in the course of six and one-half minutes. The slurry of the crystallized product was then cooled to room temperature and filtered. Analysis of the purified product showed the alpha-naphthol content thereof to be 0.12%.

EXAMPLE 3

A mixture of 74.3 g. of beta-naphthol, 0.75 g. of alpha-naphthol and 750 cc. of water was heated to 95° C. to melt the naphthols. This mixture was cooled with vigorous stirring over the range of 90° C. to 81° C. in the course of 13 minutes. Upon cooling to room temperature, the crystals were filtered and dried and assayed less than 0.1% alpha-naphthol.

EXAMPLE 4

A mixture of 138.6 g. of beta-naphthol, 1.4 g. of alpha-naphthol and 700 cc. of water was heated to melt the crystals. The mixture was cooled with vigorous agitation from 91° C. to 80° C. where crystallization occurred over a period of 15 minutes. Upon cooling to room temperature, the recovered crystals showed only a trace of alpha-naphthol.

EXAMPLE 5

(A) A mixture of one part of beta-naphthol (containing 1.2% alpha isomer) in four parts of water was heated at 95° C. until the naphthols had melted. The mixture was then dropped into 8 parts of vigorously stirred water at 35° C. and this temperature maintained for 10 minutes with continuous stirring. Upon collection by filtration, the crystallized product was found to contain 0.60% alpha isomer. It is seen, therefore, that very rapid cooling over the crystallization range is not as effective in reducing the alpha-naphthol content as slower cooling.

(B) The same procedure as (A) (above) was carried out except that the stirring at the 35° C. temperature was continued for 30 minutes. The product recovered in this instance had the same alpha-naphthol content as in (A) above. Thus, it is seen that extraction of the already formed crystals for a prolonged period does not reduce the alpha-naphthol content.

EXAMPLE 6

A sample of beta-naphthol containing 1.2 percent alpha-naphthol was melted by heating to 95° C. and extracted four times with an equal weight of water at 95° C. Analysis of the beta-naphthol showed that the alpha-naphthol content remained unchanged, i.e., 1.2 percent. It is thus apparent that extraction at a temperature above the crystallization temperature is ineffective for removing the alpha isomer impurity.

I claim:

1. A method of treating beta-naphthol to separate therefrom alpha-naphthol, present in an amount of from about 1 to about 3 percent therein, comprising (1) forming a mixture of the beta-naphthol, in molten form, and water at a temperature above 90° C., (2) cooling the mixture, with continuous stirring, over the range of from about 90° C. to about 80° C. and over a period of at least about 30 seconds to effect crystallization of the beta-naphthol and extraction of alpha-naphthol into the water, and (3) filtered off the beta-naphthol crystals.

2. The method of Claim 1 wherein the cooling is effected over a period of from about 3 minutes to about 15 minutes.

References Cited

UNITED STATES PATENTS

| | | | |
|---|---|---|---|
| 1,717,009 | 6/1929 | Davis | 260—621 B |
| 3,076,035 | 1/1963 | Peck | 260—621 B |

OTHER REFERENCES

Mukhin et al.: "Chem. Abstracts," vol. 26, p. 19 (1932).

"Hand. of Chem. and Physics," 46th edition, pp. C419–C420 (1965).

LEON ZITVER, Primary Examiner

N. MORGENSTERN, Assistant Examiner